United States Patent [19]

Hestad et al.

[11] 4,410,765
[45] Oct. 18, 1983

[54] TELEPHONE CALL ROUTING AND CHARGING SYSTEM

[75] Inventors: Alfred M. Hestad; Harry O. Hansen, both of Chicago, Ill.

[73] Assignee: United Networks, Inc., Chicago, Ill.

[21] Appl. No.: 270,385

[22] Filed: Jun. 4, 1981

[51] Int. Cl.³ .................... H04M 15/18; H04M 17/00
[52] U.S. Cl. ........................... 179/7.1 R; 179/6.3 R; 179/18 EA
[58] Field of Search ............ 179/7.1 R, 18 EA, 6.3 R, 179/6.31, 7 R, 18 AD, 18 E, 18 ES, 18 FA; 364/467, 705

[56] References Cited

U.S. PATENT DOCUMENTS 4,122,308  10/1978  Weinberger et al. ............ 179/7.1 R Primary Examiner—Stafford D. Schreyer
Attorney, Agent, or Firm—McDermott, Will & Emery

[57] ABSTRACT

A telephone call routing and charging system using processor circuitry can automatically select the most economical route for individual telephone calls. The system includes a signal direction detector for automatically determining the time span of a call for charge purposes from the time the call is answered to the time the call is terminated.

25 Claims, 3 Drawing Figures

TELEPHONE CALL ROUTING AND CHARGING SYSTEM

FIELD OF THE INVENTION

This invention is concerned with telephone systems and more particularly with the automatic routing and charging means used for routing and efficiently obtaining the charges for long distance telephone calls.

BACKGROUND OF THE INVENTION

Routing is an inherent problem with long distance telephone calls. Accordingly, there are many systems for selecting routes between long distance stations. It is possible for example to go from New York to Los Angeles through Chicago or through Dallas, Tex., both with almost equal facility and speed even though some routes are longer than others. Now in addition to selecting a particular route, it is also useful to be able to select from between different methods of traversing the long distances. For example, it is possible to route a call through the Bell System long lines. It is also possible to route the call through alternate carriers such as MCI and Sprint, for example. Thus, with modern technology, it is possible to use one system in favor of another system to minimize the cost. Such savings in long distance calls could easily add up to large sums of money for businesses which customarily make many long distance calls. Thus it is important to provide an efficient routing system wherein the cost of the call to the caller is a determining factor.

In addition to routing the calls through the least costly routes, it is also important to speedily determine when the called party answers to determine the exact time of the telephone call, that is the time for which the charged customer has to pay. Such a determination is especially useful in PABX systems used in hotels and motels. For example, when a guest originates a call in a hotel or a motel he is not usually interested in how the call gets from his telephone to the called party's telephone. He is of course interested in the cost of such a call and since this appears on his bill he can readily check the cost. Oftentimes the guest makes calls just prior to departure. In such cases it is necessary for the hotel or the motel to know the cost of the call accurately so as to be able to bill the guest and not suffer any losses.

As a matter of fact, with an efficient system for selecting the least expensive route and for accurately determining the cost of the call, it is possible for the hotel or the motel to charge the guest less than he would normally pay for the call through Bell long lines and still make a profit per call where routed through alternate carriers.

Presently, however, there is no way that the hotel or the motel can accurately determine the length of the call because of lack of answer supervision from the central office. In present call routing systems, the call is timed from a fixed period of time after its initiation until its termination. For example, call routing systems assume that if a hotel guest is off hook for a period of say 30 seconds or more, the call was answered while in fact the line could have been left ringing for more than 30 seconds. The guest would in such instances be charged for calls which were not answered. In the proposed system, both the initiation of the call and the termination are readily detected and thus the time span therebetween is readily measured. Therefore, there is a longfelt need for a private system such as PABX'x, PABX add-ons, or even a system within a subscriber station that can accurately determine when the called party answers in addition to when the call is terminated.

SUMMARY OF THE INVENTION

It is an object of the present invention to provide new and improved telephone routing and charging systems in which the above-referred to disadvantages are substantially reduced or needs are met.

According to the present invention, a private telephone routing and charging system is provided for ascertaining the most cost effective route for telephone calls and for determining the time spans starting when the called party answers until the call circuit is disconnected, said system comprising:

a calling station, a selected call station, means for connecting said calling station to said selected called station, means for determining the originating station of speech signals passing between said called and calling stations, and means for starting the measurement of said time span responsive to the initiation of speech at said called station.

The system in a preferred embodiment further provides means for determining the most cost effective route for the call responsive to receiving input information from the calling station.

In addition, the system includes means for determining when one-way speech or signalling takes place and for enabling charging for such one-way speech and/or disconnecting and announcing the reason for the disconnect.

A further object of the invention is to enable the system to determine when one-way data transmission is taking place to enable charging for such transmission or for disconnecting.

Yet another object of the invention is to provide the equipment at private systems such as PABX's and even private subscriber stations for determining the cost of each call and/or the total telephone charges per period. A related object is to provide equipment at the private system that economically determines when the called party begins to transmit.

BRIEF DESCRIPTION OF THE DRAWINGS

The operation and utilization of the present invention will be more fully apparent from the description of a preferred embodiment taken in conjunction with the accompanying drawings in which.

GENERAL DESCRIPTION

Figure 1:
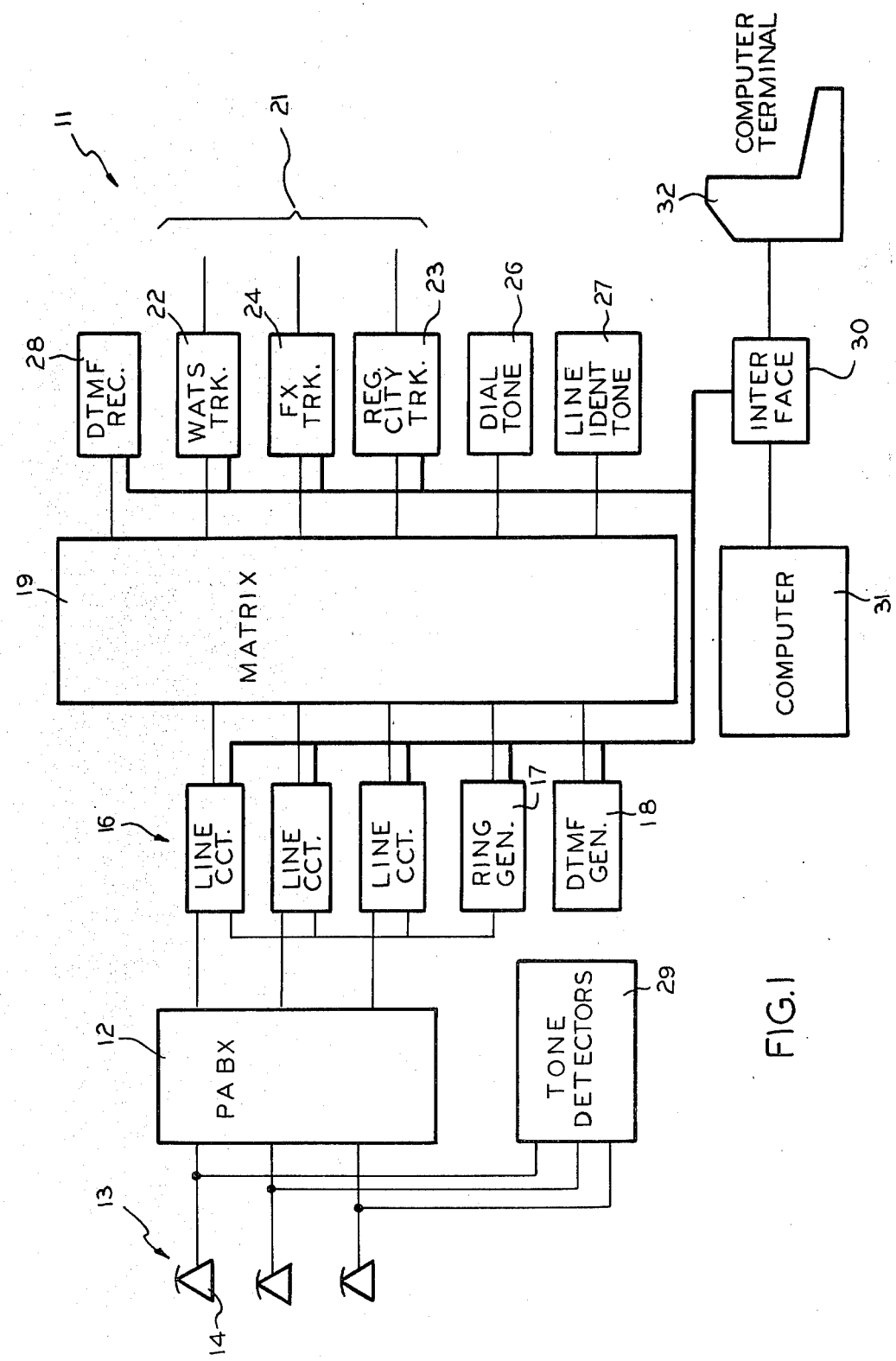
FIG. 1 is a simplified block diagram showing a least cost routing system.

The least cost routing system generally shown as 11 in FIG. 1 demonstrates a call originating in a PABX system going to outside lines. It should be understood that similar least cost routing systems could also be used in other communication systems.

The system is shown as including the PABX equipment 12 having stations generally shown as 13 including a telephone subscriber station 14, for example. The telephone call routing and charging system includes line circuits 16, auxiliary circuits such as: ring generator 17 and dual tone multi-frequency generator (DTMF generator) shown as 18. The line circuits and the DTMF tone generator are all shown connected to a switching matrix 19. The ring generator is connected directly to each of the line circuits.

The matrix 19 is connected to outside lines shown generally as 21. The outside lines contain such circuitry as a WATS trunk circuit 22, a regular city trunk circuit 23 and a "Fx" trunk circuit 24. In addition there is shown connected to the switching matrix such circuits as a dial tone generator 26, a line identification tone generator 27 and a DTMF receiver 28.

Means are provided for processing the calling signals to determine, based on input information that was previously stored, the most economic route for each call. More particularly, a computer 31 is shown. The computer is shown as being connected to the matrix, tone-detectors, line-circuits, ring generator, DTMF generator, DTMF receiver, WATS trunks, Fx trunks and the regular city trunk.

Means such as a computer terminal 32 is shown for use in entering commands and stored information into the computer as to the best possible route selection. The computer terminal 32 is shown coupled to the computer through interface circuit 30.

The operation of the system shown in FIG. 1 provides that when an extension such as subscriber-station 14 dials the access digit for an outgoing trunk call the line circuit connected to the PABX equipment 12 senses that a call has been originated and extends this information to the computer 31. Computer 31 sends a signal to the matrix that causes the line identification tone circuit 27 to be connected to the line circuit momentarily. The tone detectors 29 identify which line originated the call. The identification is possible because the tone is extended to one line at a time. The originating or calling line information is extended to the computer which records the identification information of the originating line. The computer then causes the dial tone to be connected to the originating line through the matrix.

If the calling party is using a rotary dial, then the dial pulses are detected in the line circuit and transmitted via the data bus to the computer 31. If the calling party is using a DTMF dial then the computer causes a DTMF receiver 28 to be connected via the matrix 19 to the line circuit 16. The DTMF receiver extends the dialed information via the data bus to the computer. The dialed information is not transmitted directly to the trunk circuits for neither rotary nor DTMF dialing. The computer 31 analyzes the dialed information to determine which is the least expensive route to use in setting up the call. Upon that determination being made the proper outgoing trunk is accessed. The trunk is not connected to the calling line circuit until after the digits have been transmitted under the control of the processor. This prevents the line circuit from hearing dial tone again.

In the case of DTMF dialing, then the computer 31 causes the DTMF generator 18 to be connected via the matrix 19 to the trunk. The computer 31 extends the digits to the DTMF generator which in turn generates DTMF signals which are transmitted via the matrix and trunk to the outside line.

In the case of rotary dialing, then the computer 31 extends the digits to be dialed directly to the trunk. The computer 31 extends the digits to obtain connection to the called line after dial tone has been received and detected.

When the call is routed through such services as Sprint or MCI, then a characteristic tone similar to dial tone is received after the service has been accessed. This tone is detected prior to the transmission of the additional digits. In the absence of this tone the call may be routed via regular long line telephone lines or other alternative systems or carriers dependent on the requirement of the calling line. In the case of services such as Sprint or MCI, an identification code is required prior to sending the called number. The identification code must be in the form of DTMF signals. Therefore, the DTMF signal generator 18 is shown connected to the line circuit in such cases through the matrix 19. When all the digits have been transmitted, then the calling line is appropriately connected to the trunk. When the called party answers, the two parties may converse and the call is timed for computing the charge for the call.

Means are provided for determining when the call party and/or the calling party starts to speak or otherwise transmit. A system for determining when the calling and/or the called party starts to speak is shown generally at 36 in FIG. 2. The call is considered to be answered for charging purposes, after transmission originating at the called and/or the calling station has been detected. The detectors are shown in the trunk and the call answered information is extended to the computer via the data bus.

Figure 2:
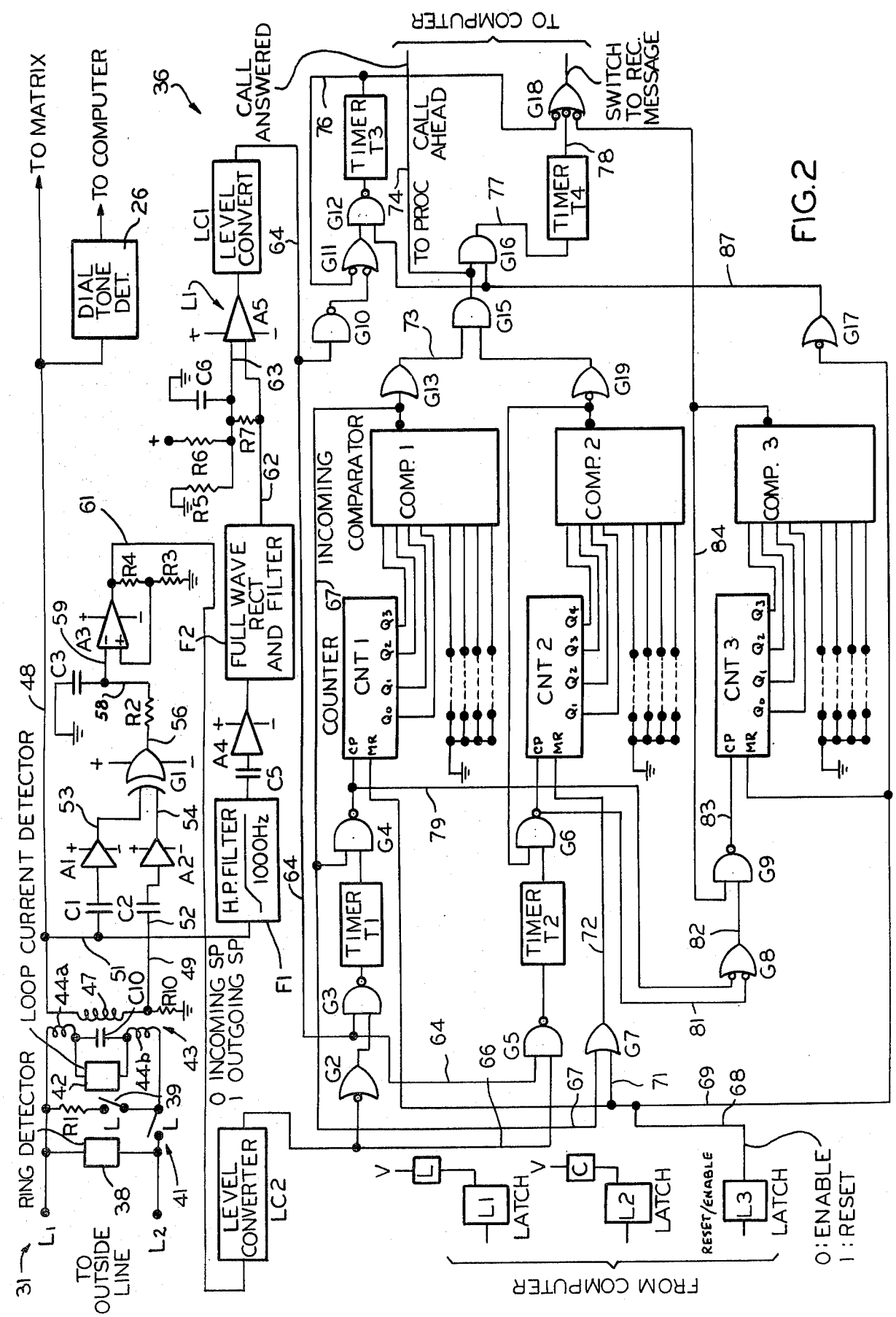
FIG. 2 is a simplified schematic diagram showing the detection in the calling party equipment of transmission by the calling party and/or the called party.

While the detector for determining the called and/or calling party begins to transmit is shown as being part of a trunk circuit in FIG. 2, it must be understood that the detector can easily be located in a line circuit or even right at the subscriber station, within the scope of this invention.

The trunk circuit 37 is shown as including a ring detector 38, loop-current detector 42 and relays L and C. The ring detector 38 and loop-current detector 42 extend their information to the computer 31. This has not been shown on the schematic. The L and C relays are controlled as indicated by latches L1 and L2 which in turn are controlled by the computer 31. Relay-contact 41 represents the relay-contact from the L relay. Relay-contact 39 represents the relay-contact from the C relay. Contacts 41 and 39 and resistor R1 are connected in series across the lines L1 and L2 of the trunk circuit. The L relay provides off hook loop closure and also transmits dial-pulses for outgoing calls. The C relay is operated during transmission of dial-pulses and prevents distortion of dial-pulses. The trunk circuit further includes a transformer 43. The primary winding is shown as having two parts 44a and 44b joined by a loop current detector 42 which is bridged by a capacitor C10. The lines L1 and L2 are connected to outside lines.

The secondary of the transformer is shown as having a single winding 47 which is connected across the lines of the trunk circuit conductors 48 and 49. The lines 48 and 49 are parallel connected to the matrix and electronic circuitry. Line 49 is further connected to ground through a resistor R10.

Figure 3:
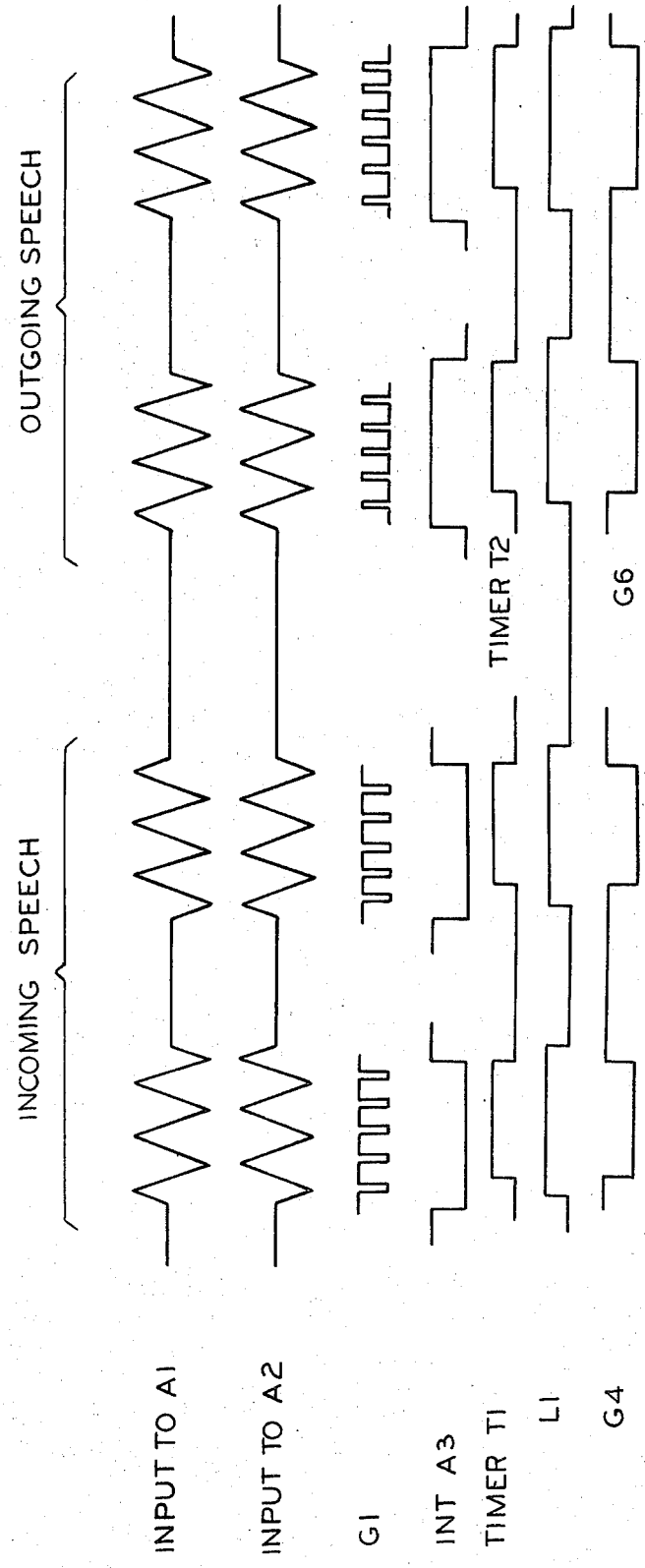
FIG. 3 is a timing diagram of the various circuits shown in the schematic diagram of FIG. 2.

The entire system is shown as being computer controlled in that the information is passed to a computer. The system provides answer supervision by detecting the direction of speech and also determines amplitude threshold levels as a requirement for such detection. The line 48 which goes to the matrix is connected through conductor 51, capacitor C1 to amplifier A1. The line 49 is connected through a conductor 52, capacitor C2 to amplifier A2. The inputs to amplifiers A1 and A2 are 180 degrees out of phase when the signal at winding 47 is *coming* from an outside line. When the signal is *going* to the outside line the input signals at amplifiers A1 and A2 are in phase. For example, when speech originates at a sub-set coupled to the matrix and consequently is coupled from the matrix to line 48 then the input signals to amplifiers A1 and A2 are in phase; when speech originates across lines L1 and L2, the speech signals are out of phase. The inputs to the amplifiers A1 and A2 are shown in FIG. 3 and identified as incoming speech and outgoing speech to show the in-phase and out-of-phase conditions.

The outputs of the amplifiers A1 and A2 are connected through conductors 53 and 54 respectively to two inputs of an Exclusive-OR gate G1. Because of the noted phase conditions the output of the gate G1 on conductor 56 will be high for incoming signals and low for outgoing signals.

The output of the Exclusive-OR gate G1 (shown in FIG. 3) is coupled to means for eliminating spikes such as the integrating capacitor C3 shown in conjunction with operational amplifier A3. The negative input of amplifier A3 is connected to the output of the Exclusive-OR gate G1 through conductor 56, resistor R2 and conductors 58 and 59. Conductor 58 is grounded through the integrating capacitor C3. The positive input of operational amplifier A3 is connected to a feedback voltage divider network comprising the series resistors R3 and R4 connected between ground and the output of the amplifier A3. The output of amplifier A3 is connected through conductor 61 to the input of a level converter LC2. The output of the converter LC2 is coupled over conductor 66 to gates G2 and G5. The output of amplifier A3 indicates incoming signals by a low and outgoing signals by a high.

The signals coupled to the input of amplifier A1 through conductor 51 are also connected to a high pass filter F1. The filter F1 blocks tone such as busy tone, ring back tone and others so that these tones will not be mistaken for an answer condition. In a preferred embodiment, the high pass filter pass frequency is approximately 1000 Hertz. The output of filter F1 is coupled to the input of an operational amplifier A4 through capacitor C5. The output of amplifier A4 is coupled to the input of a full wave rectifier and filter shown as F2. The output of F2 are the signals converted to DC. The DC voltage is coupled to the positive input of a level detector generally shown as L1 over conductor 62.

The level detector comprises an operational amplifier A5. The negative input of amplifier A5 is connected to conductor 62 through resistor R7 and conductor 63. Conductor 63 is connected to positive voltage through resistor R6 and to ground through resistor R5 bridged by capacitor C6. The output of the level detector L1 goes to a level converter LC1. The output of L1 goes high when speech is present, otherwise it is low.

The output of the level converter LC1 is coupled to gates G10, G3 and G5 over conductor 64. The output of amplifier A3 on line 61 is such that it is low when the speech signals are incoming and high when the speech signals are outgoing. The gate G5 has an input over line 64 and an input from the level converter over line 66.

Each pulse appearing at the output of L1 represents a burst of speech. The outputs of amplifier A3, the level detector L1, and gates G4 and G6 are shown in FIG. 3. In addition, the outputs of timers T1 and T2 are also shown in that figure.

When the output of detector L1 is caused by incoming speech, pulses are coupled through converter LC1, gate G3, timer T1, and gate G4 to a counter circuit CNT1. Gate G3 has two inputs, one from line 64 and the other from the output of gate G2. The counter CNT1 counts the pulses at the output of level detector L1 when the level is sufficiently high. The output of the counter CNT1 is coupled to a comparator shown as COMP1. The output of the comparator is connected to gate G13, to one of the inputs of gate G4 through conductor 67 and to an input of gate G7.

Note that as shown, the comparator may be programmed by straps for counts of 1 to 16. When the programmed number of counts have taken place the output of the comparator COMP1 goes low to inhibit gate G4. The output of gate C13 goes high responsive to its input going low. The low input from the comparator COMP1 to gate G7 removes the reset from a counter CNT2 controlled by gate G7. The reset signal is received by the counter over conductor 68 and is transmitted through gate G7 over conductors 69 and 71 to the input of gate G7 and over conductor 72 to the reset input of counter CNT2. The delay in removal of the reset from counter CNT2 until after speech has been detected from the called party prevents counting speech bursts if the calling party is talking before the call has been answered. Note that after incoming speech has been detected then counter CNT2 is enabled. The burst of outgoing speech is then counted by counter CNT2.

The computer 31 provides an enable for the speech-detector via latch 3. The output of latch 3 is extended over conductor 68 and 69 to counters CNT1 and CNT3. The output of latch 3 is further extended via gate G7 to counter CNT2. The enable output of latch 3 is further extended to inverter G17. G17 inverts the signal and it is extended via conductor 87 to one of the inputs of gates G12 and G16 to provide an enable signal.

Responsive to the high at the output of G13, the output of gate G15 goes low. G15 has one input connected to the output of G13 over conductor 73. The information at the output of gate G15 is extended to the processor via conductor 74. The information represents a "call answer".

Means are provided to prevent cheating that might otherwise occur when the called party does not transmit. For example, if during the call, the calling party merely makes a call and transmits data. The cheating prevention operates when the data is a continuous stream of signals such that the counters would not be activated. If the signals are continuous then the output of LC1 the level converter is continuously high. The high signal output of level converter LC1 on conductor 64 is transmitted via gates G10, G11 and G12 to a timer T3. If the signals are interrupted such as they would be with speech, then timer T3 is reset. If the signals are continuous then timer T3 times out and the output of the timer T3 goes low. The low output from timer T3 is extended via conductor 76 to one of the inputs of gate G11. This prevents the timer T3 from being reset until it is reset from the computer. The low output from timer T3 is also extended via conductor 76 to one of the inputs of gate G18 causing the output of gate G18 to go high. The output from gate G18 is extended to the computer and when high causes the computer to disconnect the call and apply a recorded message. The output of timer T3 may also be used to set answer supervision. This usage is not shown on the schematic.

In order to prevent the line from being held continuously if there is no speech then a timer means such as timer T4 is used. Timer T4 is activated responsive to a signal from gate G16 over conductor 77. The timer T4 times out and when it times out a recorded message is switched on by the signal applied from gate G18 over conductor 78 in much the same manner as caused by the signal on conductor 76. The time out causes disconnect.

A third counter CNT3 is shown which functions to count the total number of speech bursts independent of direction. When the specified number of counts have occurred a recorded message may be switched in and the call disconnected. This prevents cheating by having a one way conversation. The input of the counter CNT3 is through gates G8 and G9 in series. Gate G8 is connected to the output of gates G4 and G6 over conductors 79 and 81 respectively. The output of gate G8 is coupled to the input of gate G9 over conductor 82. The output of gate G9 is connected to the counter CNT3 circuit over conductor 83. A feedback input is connected to gate G9 which extends from the output of the comparator COMP3 over conductor 84. The comparator COMP3 is connected to the output of the counter CNT3 and it too provides a signal over conductor 84 going to gate G18 and to the processor to switch on record message and disconnect. Conductor 69 is also connected to the input of G17. The output of gate G17 is conncected to the inputs of gates G12 and G16 over conductor 87.

Generally speaking, the timer T1 prevents very short bursts of signal such as those caused by noise from being coupled to counter CNT1. Timer T2 also blocks short bursts of signals from being counted by counter CNT2.

Resistors R5, R6 and R7 provides biasing or threshhold levels for level detector L1. In cases where the noise level on the line is high then the filter F2 will have some positive voltage at the output even when no speech is present. This positive voltage is coupled through resistor R7 to the inverting input of amplifier A5 causing the threshhold level to be raised. Capacitor C6 integrates bursts of speech changing the potential appreciably on the inverting input of amplifier A5. Thus noise is not detected and speech is detected.

The dial tone detector 26 provides information to the processor when dialing can begin and the dialed numbers can be outpulsed. Thus the system presented determines the direction of the signals and from the determination can ascertain when the signals are incoming and when they are outgoing. The system uses this information in a unique manner to determine the costs of the calls. The system is also provided with means for preventing cheating by using one way transmission of either voice or data.

As is shown in the timing diagram of FIG. 3, the output of gate G1 and of the integrator 57 is undetermined during the absence of transmission and therefore is not shown for that period of time.

The input to amplifier A1 and the input to amplifier A2 are either in phase or out of phase depending on the direction of the detected speech. Exclusive OR gate G1 reflects the in-phase or out-of-phase condition. The signal from gate G1 is integrated by capacitor C3 in order to eliminate the spikes that appear on the output of gate G1. The amplifier A3 detects and amplifies the voltage on the capacitor C3. The output of amplifier A3 provides a signal to timers T1 and T2. The low signal activates timer T1, the high signal activates timer T2. The level detector working in conjunction with the output of the timers provides a signal to gates G4 and G6 respectively, for generating signals indicating incoming signals or outgoing signals. Thus gate G4 is operated by the conjunction of signals from the timer T1 and the level detector to provide an indication of incoming signals while the output of gate G6 operates responsive to the output from timer T2 and the level detector to provide an output when there are outgoing signals.

The charge portion of the system is ideal for use even without automatic least cost routing. It can function even on private telephone lines for use in conjunction with home computers to monitor telephone costs. Of course such usage is ideal for business. For example, law firms can use the unique answer supervision for obtaining accurate telephone billing information per client.

While the principles of the invention have been described above in connection with specific apparatus and applications, it is to be understood that this description is made by way of example only and not as a limitation on the scope of the invention.

What I claim is:

1. A telephone least cost routing and charging arrangement for enabling private branch systems to route calls from a calling station to a distant called station so as to obtain the least charge for the call, said arrangement comprising:
   a calling station,
   dial means at said calling station for generating control signals indicative of the called station,
   computer means including stored information for selecting the least cost route responsive to said control signals in said stored information,
   means for connecting the calling station to the called station over said selected route,
   means for detecting data signals from one of said stations,
   means for distinguishing between data signals originating at the called station and at the calling station, and
   means for automatically timing the duration of the call for charge purposes from the time a data signal from said called station is detected until the termination of the call independently of telephone answer supervision.

2. The telephone arrangement of claim 1 wherein said least cost routes include microwave systems.

3. The telephone arrangement of claim 1 wherein said least cost routes include long line means.

4. The telephone arrangement of claim 1 wherein said least cost routes include satellite means.

5. The telephone arrangement of claim 1 wherein said least cost routes include microwave systems, long line systems and satellite systems.

6. The telephone arrangement of claim 1 including transformer means coupling said calling station to outside lines, said transformer means having at least a primary and a secondary winding, said secondary winding being coupled to said calling station while said primary winding is coupled to said outside lines, said secondary winding having a first end and a second end and wherein said means for distinguishing comprises means for determining the phase relationship between signals at said first and said second end of said secondary winding.

7. The telephone arrangement of claim 6 wherein said means for determining the phase relationship comprises exclusive OR gate means, and means for individually attaching said first and second ends of said secondary winding to inputs of said exclusive OR gate means.

8. The telephone arrangement of claim 7 wherein level determination means are provided coupled to the said secondary winding to assure that the signal at said first and second ends of said winding is at least a predetermined amplitude.

9. The telephone arrangment of claim 1 wherein timing means responsive to receipt of a continuous signal for a fixed period of time are provided coupled to said distinguishing means for disconnecting said call.

10. The telephone arrangement of claim 1 including means for detecting a one-way data transmission, means responsive to a one-way data transmission from said calling station to said called station coupled to said distinguishing means for disconnecting said call.

11. The telephone arrangement of claim 1 wherein timing means are provided coupled to said distinguishing means for disconnecting the call if no signal is detected coming from said called station after a fixed period of time.

12. A telephone call cost determining arrangement for calculating the cost of each call without relying on central office information, said arrangement comprising:
  means for connecting said arrangement to a telephone system,
  calling station means in said arrangement,
  means in said telephone system for connecting said calling station means to a desired called station responsive to the receipt of dial information from said calling station,
  means for detecting a data signal from said called station, said detecting means including means for distinguishing data signals originating at the called station and at the calling station, and
  means for automatically timing the duration of the call between said connected calling and called station for charge purposes from the time said data signal from said called station is detected until the termination of the call.

13. The arrangement of claim 12 wherein said arrangement is provided in PABX systems.

14. The arrangement of claim 12 wherein the arrangement is provided at subscriber stations.

15. The arrangement of claim 12 wherein said arrangement includes transformer means coupling said calling station to outside lines, said transformer means having at least a primary and secondary winding, said primary winding coupling to the said outside lines, said secondary winding coupling to the sub-station telephone instrument and wherein said means for timing the duration of the call comprises distinguishing means for distinguishing between signals originating at the called station and those originating at the calling station.

16. The arrangement of claim 15 wherein said distinguishing means comprises means for determining the phase relationship at said first and second ends of said secondary winding.

17. The telephone arrangement of claim 16 wherein said distinguishing means comprises exclusive OR gate means and means for coupling said first and second ends of said secondary winding to individual inputs of said exclusive OR gate means.

18. The telephone arrangement of claim 17 wherein level detector means are provided for assuring that the signal received from said calling station has a certain minimum amplitude.

19. The telephone arrangement of claim 12 wherein first timing means responsive to there being no signal received from said calling station after a certain predetermined period of time are provided for disconnecting the call.

20. The telephone arrangement of claim 12 wherein second timing means responsive to the receipt of a continuous signal from said calling station after a certain predetermined period of time are provided for disconnecting the call.

21. The telephone arrangement of claim 12 including means for detecting a one-way data transmission and a means responsive to there being signals only from the calling station for disconnecting the call.

22. The telephone arrangement of claim 1 including means for filtering low frequency signals to prevent busy tones from being mistaken for data signals.

23. The telephone arrangement of claim 8 including means for sensing the noise level and means for raising the threshhold level of said level determination means in response to the sensing of a high noise level.

24. The telephone arrangement of claim 12 including means for filtering low frequency signals to prevent busy tones from being mistaken for data signals.

25. The telephone arrangement of claim 18 including means for sensing the noise level and means for raising the threshhold level of said level detector means in response to the sensing of a high noise level.

* * * * *